No. 744,167. PATENTED NOV. 17, 1903.
J. R. COLLINS.
COMBINATION PLIERS AND PIPE WRENCH.
APPLICATION FILED FEB. 21, 1903.
NO MODEL.

Witnesses.
A. H. Opsahl.
N. D. Kilgore.

Inventor
John R. Collins
By his Attorneys
Williamson & Merchant

No. 744,167. Patented November 17, 1903.

UNITED STATES PATENT OFFICE.

JOHN R. COLLINS, OF OWATONNA, MINNESOTA.

COMBINATION PLIERS AND PIPE-WRENCH.

SPECIFICATION forming part of Letters Patent No. 744,167, dated November 17, 1903.

Application filed February 21, 1903. Serial No. 144,422. (No model.)

*To all whom it may concern:*

Be it known that I, JOHN R. COLLINS, a citizen of the United States, residing at Owatonna, in the county of Steele and State of Minnesota, have invented certain new and useful Improvements in Combination Pliers and Pipe-Wrenches; and I do hereby declare the following to be a full, clear, and exact description of the invention, such as will enable others skilled in the art to which it appertains to make and use the same.

My invention has for its object to provide an improved tool in the nature of a combination pliers and pipe-wrench; and to this end it consists of the novel devices and combinations of devices hereinafter described, and defined in the claim.

The invention is illustrated in the accompanying drawings, wherein like characters indicate like parts throughout both views.

Figure 2:
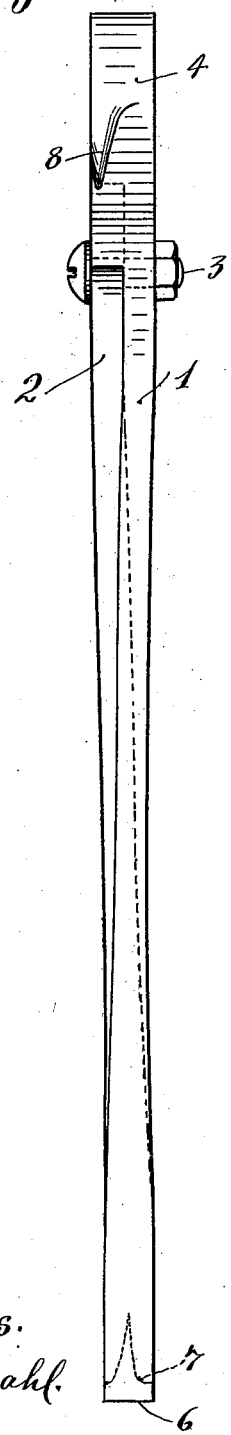
Figure 1:
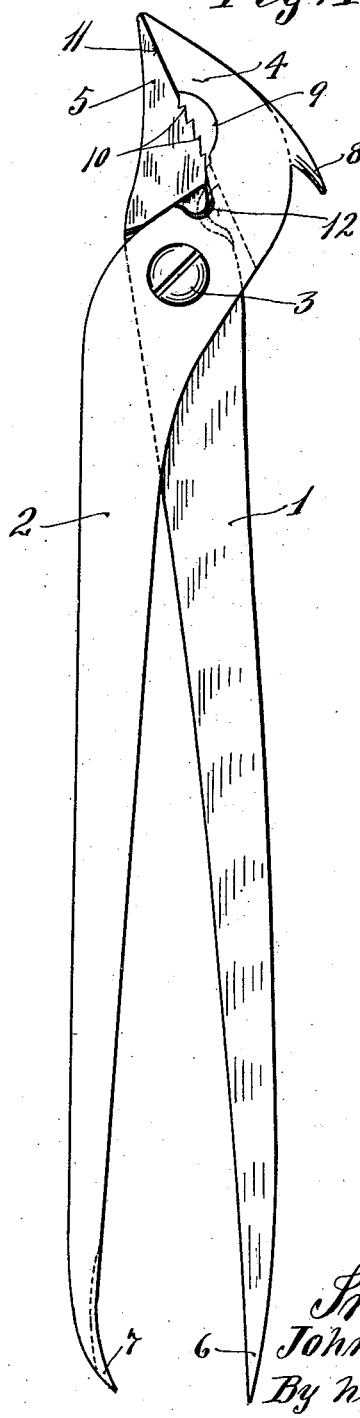

Figure 1 is a plan view, and Fig. 2 is an edge elevation of the tool.

The numerals 1 and 2 indicate a pair of levers pivotally connected at 3 and provided with coöperating jaws 4 and 5, respectively. The extended end of the lever 1 is so formed that it affords a screw-driver 6, and the extended end of the lever 2 is so formed that it affords a pronged nail or tack pulling claw 7. On its outer rounded surface the jaw 4 is formed at one side with a staple-pulling prong 8, and on its inner surface it is formed with a segmental notch or depression 9. The jaw 5, opposite the notch 9, is formed with ratchet-like teeth 10, the points of which terminate in a common plane that extends at an angle to the body of the lever 1 and intersects tangentially an imaginary circle struck from the center of the pivot 3. The faces or longest surfaces of the teeth 10 are approximately parallel and extend longitudinally of the lever 1. This arrangement of the teeth is important, as will hereinafter more fully appear. The points of the jaws 4 and 5 are provided with straight clamping or pinching surfaces 11, which when the jaws are pressed together both extend in the same plane or in approximately the same plane as the points of the teeth 10. This feature is also important. The jaws 4 and 5 are formed inward of the notch 9 and teeth 10 with coöperating wire-cutting surfaces 12.

In view of the arrangement of the teeth 10 with respect to the lever 1 and to the coöperating notch 9 a comparatively slight pressure on the handle ends of the levers 1 and 2 will serve to keep the points of the said teeth clamped into or against even a hard and smooth rod or pipe, since under the leverage or twisting action thereon applied to the handle end of the lever 1 the said teeth are given an increased bite. The greater the force applied to the said lever the greater will be the said biting action. This is due chiefly to the fact that the faces of the teeth extend longitudinally of or in the same general direction with the said lever 1. If the faces of the said teeth were to be extended at any material angle to the lever 1, the twisting action on the pipe or rod would tend to cam or force the teeth out of engagement with the said pipe or rod. In view of the fact that the points of the teeth extend approximately in the same plane as the clamping-surface 11 of the jaw 5 it is evident that a flat piece of metal clamped by the said surfaces 11 and extended inward thereof will also be engaged by the points of the said teeth 10, and thus very securely held. The outer edge of the jaw 5 being approximately flat and extending transversely of the prong 8 affords a surface which may be struck by a hammer to force the said prong into the wood and under the transverse portion of the staple which is to be drawn.

The tool is of small cost, and by actual usage of the same I have found the tool to be efficient for the purposes had in view.

What I claim, and desire to secure by Letters Patent of the United States, is as follows:

A tool comprising the pivotally-connected levers 1 and 2, having, respectively, the jaws 4 and 5, said jaws having the coöperating straight clamping-surfaces 11, the said jaw 4 further having the segmental notch 9, and the said jaw 5 further having the ratchet-like teeth 10, the points of which teeth extend approximately in the same plane as the clamping-surface 11 of said jaw 5, and the faces of which teeth 10 extend parallel to each other and longitudinally of said lever 1, substantially as described.

In testimony whereof I affix my signature in presence of two witnesses.

JOHN R. COLLINS.

Witnesses:
ELIZABETH H. KELIHER,
F. D. MERCHANT.